(12) United States Patent
Forster et al.

(10) Patent No.: US 7,414,589 B2
(45) Date of Patent: *Aug. 19, 2008

(54) ENERGY SOURCE COMMUNICATION EMPLOYING SLOT ANTENNA

(75) Inventors: Ian J. Forster, Chelmsford (GB); Patrick F. King, Simpsonville, SC (US); Michael G. Ginn, Chelmsford (GB)

(73) Assignee: Mineral Lassen LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/751,529

(22) Filed: May 21, 2007

(65) Prior Publication Data

US 2007/0216593 A1  Sep. 20, 2007

Related U.S. Application Data

(63) Continuation of application No. 11/515,154, filed on Aug. 31, 2006, which is a continuation of application No. 10/422,609, filed on Apr. 24, 2003, now Pat. No. 7,123,204.

(60) Provisional application No. 60/375,258, filed on Apr. 24, 2002.

(51) Int. Cl.
*H01Q 13/10* (2006.01)
(52) U.S. Cl. ...................................... 343/767
(58) Field of Classification Search ......... 343/767–770, 343/702, 720
See application file for complete search history.

(56) References Cited

U.S. PATENT DOCUMENTS

| 3,961,323 A | 6/1976 | Hartkorn |
| 4,051,480 A | 9/1977 | Reggia |
| 4,068,232 A | 1/1978 | Meyers |
| 4,086,598 A | 4/1978 | Bogner |
| 4,222,056 A | 9/1980 | Graeser, Jr. |
| 4,229,745 A | 10/1980 | Kruger |
| 4,731,870 A | 3/1988 | Black |
| 4,782,345 A | 11/1988 | Landt |
| 4,926,186 A | 5/1990 | Kelly |
| 4,975,711 A | 12/1990 | Lee |

(Continued)

FOREIGN PATENT DOCUMENTS

DE  4446203  7/2003

(Continued)

OTHER PUBLICATIONS

"Lead Acid Batteries VRLA Types," Accu Oerlikon, <http://www.accuoerlikon.com/html/accud02.htm>.

*Primary Examiner*—Hoang V Nguyen
(74) *Attorney, Agent, or Firm*—Christensen O'Connor Johnson Kindness PLLC

(57) ABSTRACT

The invention relates to a wireless communication device that is coupled to an energy source, such as a battery, capacitor, or solar cell. The wireless communication device is coupled to a slot in the energy source to form a slot antenna for wireless communication. The slot antenna receives communication signals from an interrogation reader or other communication device. The wireless communication device may be attached to a device or container for purposes such as communicating information regarding identification, manufacturing, tracking, and the like. The wireless communication device may also be coupled to the energy source for power.

34 Claims, 10 Drawing Sheets

U.S. PATENT DOCUMENTS

| | | |
|---|---|---|
| 5,227,804 A | 7/1993 | Oda |
| 5,227,805 A | 7/1993 | King |
| 5,255,819 A | 10/1993 | Peckels |
| 5,339,074 A | 8/1994 | Shindley |
| 5,347,280 A | 9/1994 | Schuermann |
| 5,402,134 A | 3/1995 | Miller |
| 5,424,745 A | 6/1995 | Fonsny |
| 5,448,220 A | 9/1995 | Levy |
| 5,461,393 A | 10/1995 | Gordon |
| 5,495,218 A | 2/1996 | Erb |
| 5,497,140 A | 3/1996 | Tuttle |
| 5,507,411 A | 4/1996 | Peckels |
| 5,511,240 A | 4/1996 | Nishiyama |
| 5,515,059 A | 5/1996 | How |
| 5,621,419 A | 4/1997 | Meek |
| 5,621,422 A | 4/1997 | Wang |
| 5,684,490 A | 11/1997 | Young |
| 5,691,731 A | 11/1997 | van Erven |
| 5,719,586 A | 2/1998 | Tuttle |
| 5,754,143 A | 5/1998 | Warnagiris |
| 5,774,876 A | 6/1998 | Woolley |
| 5,812,095 A | 9/1998 | Adrian |
| 5,826,328 A | 10/1998 | Brady |
| 5,833,603 A | 11/1998 | Kovacs |
| 5,838,253 A | 11/1998 | Wurz |
| 5,864,323 A | 1/1999 | Berthon |
| 5,907,477 A | 5/1999 | Tuttle |
| 5,914,640 A | 6/1999 | Nasserbakht |
| 5,914,693 A | 6/1999 | Takei |
| 5,929,813 A | 7/1999 | Eggleston |
| 5,955,998 A | 9/1999 | Roberts |
| 5,963,177 A | 10/1999 | Tuttle |
| 5,972,152 A | 10/1999 | Lake |
| 5,995,048 A | 11/1999 | Smithgall |
| 6,005,511 A | 12/1999 | Young |
| 6,018,299 A | 1/2000 | Eberhardt |
| 6,023,244 A | 2/2000 | Snygg |
| 6,037,879 A | 3/2000 | Tuttle |
| 6,045,652 A | 4/2000 | Tuttle |
| 6,052,062 A | 4/2000 | Tuttle |
| 6,075,707 A | 6/2000 | Ferguson |
| 6,078,259 A | 6/2000 | Brady |
| 6,078,791 A | 6/2000 | Tuttle |
| 6,081,047 A | 6/2000 | Tuttle |
| 6,104,280 A | 8/2000 | Tuttle |
| 6,104,311 A | 8/2000 | Lastinger |
| 6,109,530 A | 8/2000 | Larson |
| 6,130,102 A | 10/2000 | White, Jr. |
| 6,130,602 A | 10/2000 | O'Toole |
| 6,150,948 A | 11/2000 | Watkins |
| 6,166,638 A | 12/2000 | Brady |
| 6,181,283 B1 | 1/2001 | Johnson |
| 6,188,369 B1 | 2/2001 | Okabe |
| 6,191,552 B1 | 2/2001 | Kates |
| 6,191,740 B1 | 2/2001 | Kates |
| 6,192,400 B1 | 2/2001 | Hanson |
| 6,323,566 B1 | 11/2001 | Meier |
| 6,385,407 B1 | 5/2002 | Inose |
| 6,466,634 B1 | 10/2002 | O'Toole |
| 6,483,473 B1 | 11/2002 | King |
| 6,501,435 B1 | 12/2002 | King |
| 6,538,569 B1 | 3/2003 | Dunn |
| 6,628,237 B1 | 9/2003 | Forster |
| 7,123,204 B2 | 10/2006 | Forster |
| 2002/0167450 A1 | 11/2002 | Korden |

FOREIGN PATENT DOCUMENTS

| | | |
|---|---|---|
| EP | 0126626 | 7/2003 |
| EP | 0685901 | 7/2003 |
| EP | 0297790 | 7/2005 |
| EP | 0971410 | 7/2005 |
| FR | 2806198 | 8/2004 |
| GB | 2334624 | 8/2004 |
| WO | 0137215 A1 | 5/2001 |
| WO | 9965002 | 7/2003 |

ENERGY SOURCE COMMUNICATION EMPLOYING SLOT ANTENNA

This application is a CON of Ser. No. 11/515,154 filed Aug. 31, 2006, which is a CON of Ser. No. 10/422,609 filed Apr. 24, 2003 now U.S. Pat. No. 7,123,204, which claims benefit of 60/375,258 dated Apr. 24, 2002.

FIELD OF THE INVENTION

The present invention is an energy source communication device and method that allows wireless communication of information using the energy source as a slot antenna.

BACKGROUND OF THE INVENTION

It is often desired to provide wireless communication on electronic devices. One example of such an electronic device is known as a personal digital assistant (PDA). PDAs are small computing devices that are most often powered by batteries and can store electronic information, such as contacts, emails, to-do lists, memos, notes, etc. Many electronic devices are equipped to communicate wirelessly with other electronic devices to transfer information. These devices are equipped with infrared communication ports. Some PDAs require line of sight communications that is subject to interference from surrounding light sources, but others use omnidirectional radio-frequency communication.

Radio-frequency communication requires transmission and reception circuitry. Often, this circuitry is provided in the form of a radio-frequency identification device (RFID) and antenna. RFIDs are becoming smaller in size with advances in technology and are therefore able to be placed in smaller electronic devices. Many electronic devices provide enough space to include a RFID, but do not provide sufficient space for an accompanying antenna. Depending on the RFID operating frequency, antenna size varies and can be much greater in size than the RFID. Even if an electronic device provides enough space to include an antenna, designers of such electronic devices are still faced with design issues surrounding placement of the antenna.

Therefore, a need exists to provide an easier method of including an antenna for a RFID in an electronic device, and especially in a smaller electronic device, that conforms to packaging and/or size constraints.

SUMMARY OF THE INVENTION

The present invention relates to a wireless communication device that is coupled to a slot on an energy source to provide a slot antenna for wireless communication. Such wireless communication includes identification information, manufacturing information, tracking information, and the like.

In one embodiment, the wireless communication device is attached to a coin-cell battery. The wireless communication device is coupled to a slot formed by a separator between the positive and negative terminal of the battery to form a slot antenna. The wireless communication device is also attached to the positive and negative terminals of the battery using feed lines to provide power to the wireless communication device.

In another embodiment, the wireless communication device is attached to a coin-cell battery that is essentially the same as the preceding embodiment. However, the wireless communication device only uses a single feed line to attach the wireless communication device to the positive terminal for power. The negative power input to the wireless communication device is directly attached to the negative terminal of the battery in lieu of using an additional feed line.

In another embodiment, the wireless communication device is coupled to the slot of a battery at two different points to form a slot antenna. The coupling of the wireless communication device at more than one feed point alters the radiation pattern of the slot antenna.

In another embodiment, the wireless communication device uses a feed point to couple the wireless communication device to a slot on a battery to provide a slot antenna. The feed point also acts as a feed line to couple the wireless communication device to the positive terminal of the battery for power.

In another embodiment, the wireless communication device is attached to a cylindrical-shaped battery. The wireless communication device is coupled to a slot formed by a separator between the positive and negative terminal of the battery to form a slot antenna. The wireless communication device does not attach to the battery terminals for power.

In another embodiment, the wireless communication device is placed across the slot of a battery to provide a slot antenna. Two feed points are used to couple the wireless communication device to the battery for power. One feed point is coupled to the positive terminal of the battery, and the other feed point is coupled to the negative terminal of the battery.

In another embodiment, the wireless communication device is coupled across the slot of the battery as in the preceding paragraph. In addition, one feed point is coupled to the slot at a different point to change the effective length of slot for impedance matching and improved antenna performance.

In another embodiment, the wireless communication device is attached to a cylindrical-shaped battery. The wireless communication device is coupled to a slot formed by a separator between the positive and negative terminal of the battery to form a slot antenna. The wireless communication device is also attached to the battery terminals to power the wireless communication device.

In another embodiment, the wireless communication device is attached underneath the sleeve of a battery. The sleeve is placed over the top of the body of the battery and the attached wireless communication device to encapsulate the wireless communication device to the body. The wireless communication device is coupled to a slot in the battery to form a slot antenna. Placement of the wireless communication device underneath the sleeve of the battery may be done during manufacture of the battery.

DETAILED DESCRIPTION OF THE INVENTION

Figure 1:
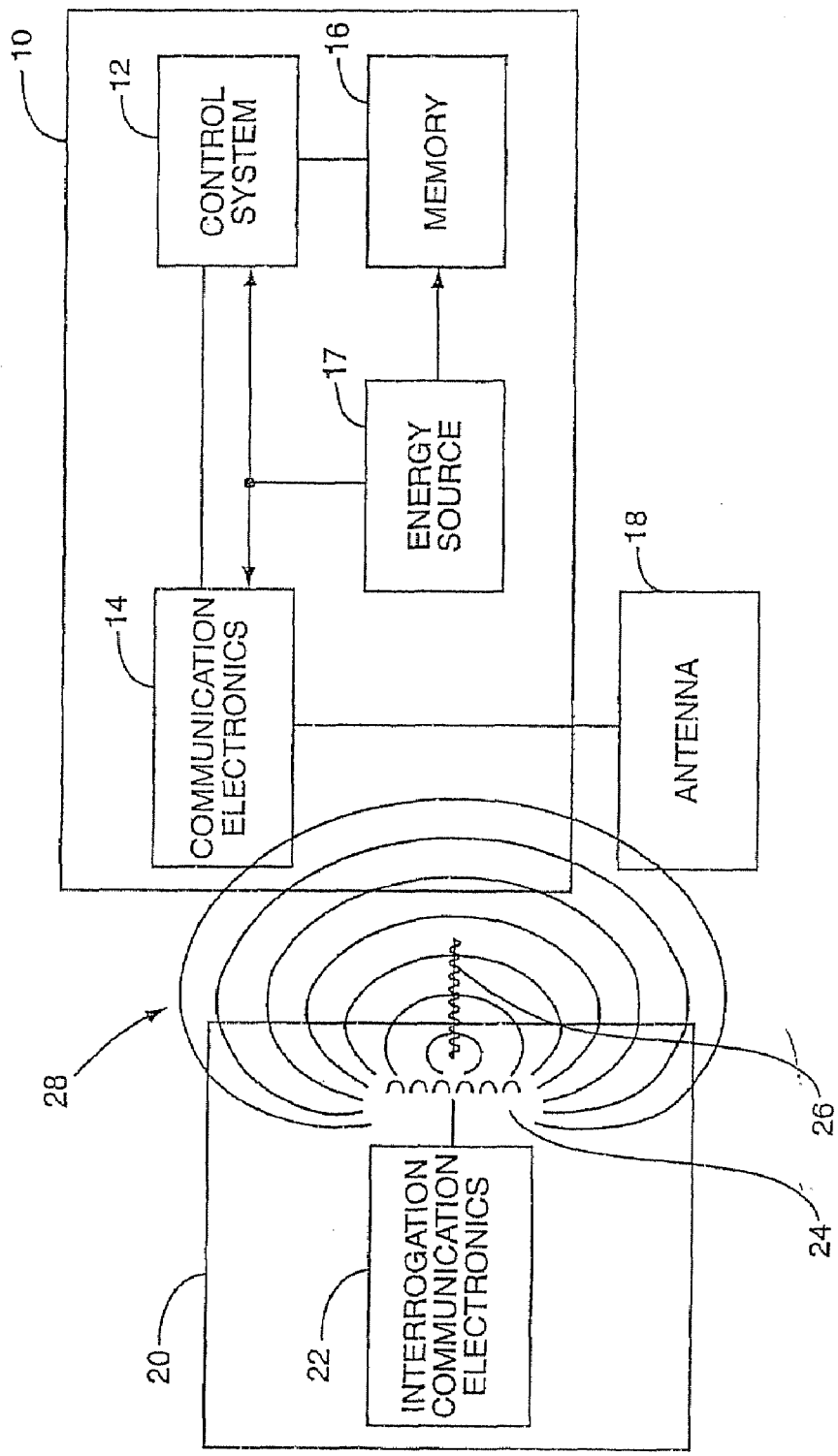
FIG. 1 is a schematic diagram of a wireless communication device in the prior art.

The present invention is directed to a device, system and method of using an energy source in an electronic device as a slot antenna. Referring now to the drawings in general, and to FIG. 1 in particular, it will be understood that the illustrations are for the purpose of describing specific embodiments of the present invention and are not intended to limit the invention thereto.

FIG. 1 illustrates a typical wireless communication device and communication system in the prior art. The wireless communication device 10 is capable of communicating information wirelessly and may include a control system 12, a communication electronics 14, a memory 16, and an energy source 17. The wireless communication device 10 may be a radio-frequency identification device (RFID), but the present invention is not limited to any particular type of wireless communication device 10. The communication electronics 14 is coupled to an antenna 18 for wirelessly communicating information in radio-frequency signals. The communication electronics 14 is capable of receiving a modulated radio-frequency signal through the antenna 18 and demodulating the signal into information passed to the control system 12. The antenna 18 may be internal or external to the wireless communication device 10.

The control system 12 may be any type of circuitry or processor that receives and processes information received by the communication electronics 14, such as a micro-controller or microprocessor. The wireless communication device 10 may also contain memory 16 for storage of information. Such information may include identification, tracking and/or other information desired. The memory 16 may be electronic memory, such as random access memory (RAM), read-only memory (ROM), flash memory, diode, etc., or the memory 16 may be mechanical memory, such as a switch, dip-switch, etc.

The energy source 17 may be any type of energy source to provide power to the components of the wireless communication device 10, including, but not limited to, a battery, a capacitor, and a solar cell.

Some wireless communication devices 10 are termed "active" devices meaning that they receive and transmit data using an energy source coupled to the wireless communication device 10. A wireless communication device may use a battery for power as described in U.S. Pat. No. 6,130,602 entitled "Radio frequency data communications device," or may use other forms of energy and/or power, such as a capacitor as described in U.S. Pat. No. 5,833,603, entitled "Implantable biosensing transponder." Both of the preceding patents are incorporated herein by reference in their entirety.

Other wireless communication devices 10 are termed "passive" devices meaning that they do not actively transmit and therefore may not need their own energy source for power. One type of passive wireless communication device 10 is known as a "transponder." A transponder effectively transmits information by reflecting back a received signal from an external communication device, such as an interrogation reader. An example of a transponder is disclosed in U.S. Pat. No. 5,347,280, entitled "Frequency diversity transponder arrangement," incorporated herein by reference in its entirety. Another example of a transponder is described in co-pending patent application Ser. No. 09/678,271, entitled "Wireless Communication Device and Method," incorporated herein by reference in its entirety.

FIG. 1 depicts communication between a wireless communication device 10 and an interrogation reader 20. The interrogation reader 20 includes an interrogation communication electronics 22 and an interrogation antenna 24. The interrogation reader 20 communicates with the wireless communication device 10 by emitting an electronic signal 26 modulated by the interrogation communication electronics 22 through the interrogation antenna 24. The interrogation antenna 24 may be any type of antenna that can radiate a signal 26 through a field 28 so that a reception device, such as a wireless communication device 10, can receive such signal 26 through its own antenna 18. The field 28 may be electromagnetic, magnetic, or electric. The signal 26 may be a message containing information and/or a specific request for the wireless communication device 10 to perform a task.

When the antenna 18 is in the presence of the field 28 emitted by the interrogation reader 20, the communication electronics 14 are energized by the energy in signal 26, thereby energizing the wireless communication device 10. The wireless communication device 10 remains energized so long as the antenna 18 is in the field 28 of the interrogation reader 20. The communication electronics 14 demodulates the signal 26 and sends the message containing information and/or request to the control system 12 for appropriate actions. It is readily understood to one of ordinary skill in the art that there are many other types of wireless communications devices and communication techniques than those described herein, and the present invention is not limited to a particular type of wireless communication device, technique or method.

In one aspect of the present invention, the wireless communication device 10 uses a gap or slot between battery terminals to form a slot antenna for wireless communication. FIGS. 2-10 illustrate various configurations of slots in batteries to provide a slot antenna 18. The wireless communication device 10 may couple to a slot in the battery to form a slot antenna 18. More information on slot antennas 18 and their operation is described in U.S. Pat. No. 4,975,711, entitled "Slot antenna device for portable radiophone," and pending patent application Ser. No. 09/536,334, entitled "Remote Communication Using Slot Antenna," both of which are incorporated herein by reference in their entirety.

Figure 2:
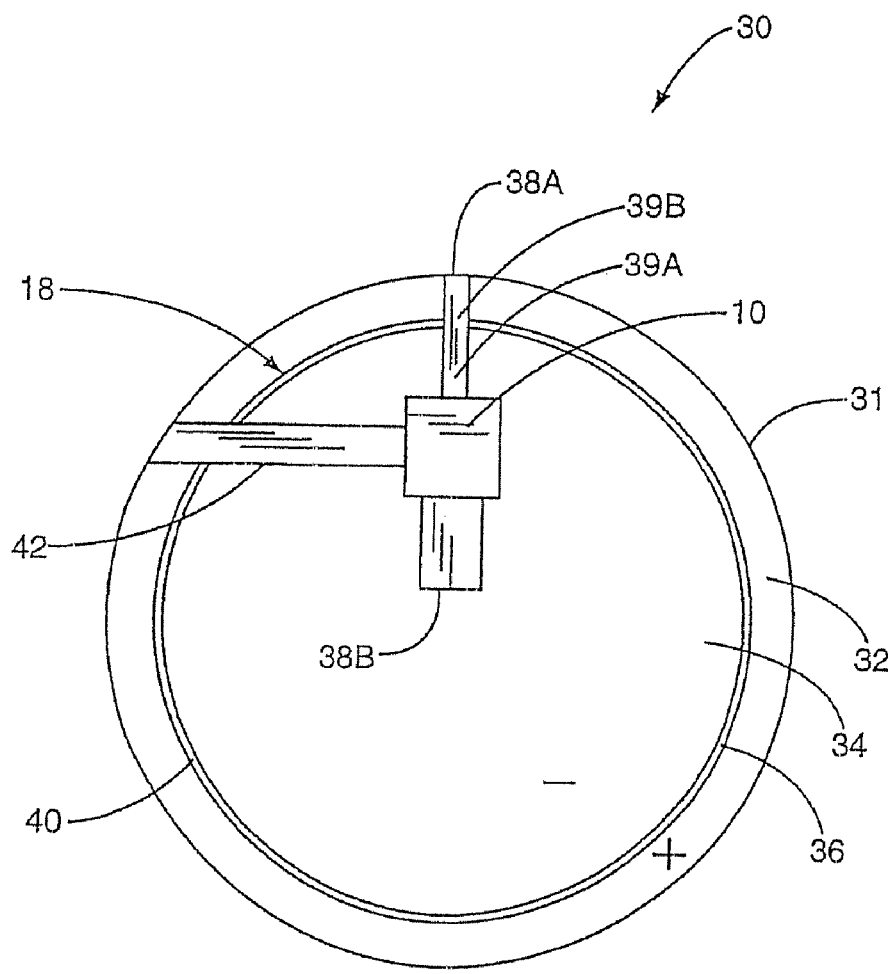
FIG. 2 is a schematic diagram of a wireless communication device attached to a coin-cell battery for power and coupled to a slot on the battery to form a slot antenna.

FIG. 2 illustrates a wireless communication device 10 coupled to an annular slot 40 in a battery 30 to form a slot antenna 18. The wireless communication device 10 uses the battery 30 to provide power for transmissions and to power other components of the wireless communication device 10, such as the control system 12, communication electronics 14, memory 16, and/or other devices contained in the wireless communication device 10.

FIG. 2 depicts a particular type of battery 30 known as a coin-cell battery. The battery 30 may a rechargeable battery, including, but not limited to lithium, Nickel Cadnium (NiCd), Nickel Metal-Hydride (NiMH). The battery 30 may also be non-rechargeable. The battery 30 may be of any voltage rating. If the battery 30 is used as an energy source 17 in the wireless communication device 10, the battery 30 must be of the proper voltage to provide power to the wireless communication device 10 and/or its components or an additional voltage-regulating device must be provided in the wireless communication device 10. For example, an additional rectifier may be included to decrease the battery 30 voltage, or a transformer may be included to increase the battery 30 voltage.

The battery 30 has two terminals—a positive terminal 32 and a negative terminal 34. The positive terminal 32 and the negative terminal 34 are separated by a separator 36. The separator 36 is a dielectric material hat creates a voltage potential between the positive terminal 32 and the negative terminal 34. The separator 36 may be constructed out of a non-conductive material or may be constructed out of a conductive material that conducts energy at currents of a particular frequency. For example, the battery 30 may be a conductor at direct current (DC) or low frequency current, but may be non-conducting at higher frequency current. In this embodiment, the separator 36 also acts as a seal between the positive terminal 32 and the negative terminal 34 to prevent the positive terminal 32 and the negative terminal 34 from short-circuiting.

The wireless communication device 10 may be placed on the battery 30, and may be either placed on one of the terminals 32, 34 or across the slot 40 formed by the separator 36 between the terminals 32, 34. An adhesive (not shown) may be used to attach the wireless communication device 10 to the battery 30. The adhesive may either be conductive or non-conductive. If the wireless communication device 10 is attached directly to the surface of the battery 30 to provide a connection between the terminals 32, 34 for power, a conductive adhesive may be used to facilitate a combined connection and adhesion. A non-conductive adhesive may be also used to attach the wireless communication device 10 to the battery 30. Examples of adhesives include tape, glue, and epoxy. The wireless communication device 10 includes two feed lines 38A, 38B. A feed line 38 is any conductive connection that allows the transfer of electricity. The feed lines 38A, 38B connect the wireless communication device 10 to the positive and negative terminals 32, 34 to provide power to the wireless communication device 10. The wireless communication device 10 is additionally grounded to the battery 30 by a feed line 38B connection to the negative terminal 34. An adhesive (not shown) may be used to attach the feed lines 38A, 38B firmly to the battery 30. A conductive adhesive (not shown) may be used with the feed line 38B since the feed line 38B does not run across the positive terminal 32 on its connection path to the negative terminal 34. However, the feed line 38B may require a non-conductive adhesive 39A on the portion of the feed line 38B that runs across the negative terminal 38B in order to prevent short-circuiting of the positive terminal 32 and the negative terminal 34. A conductive adhesive 39B may be used on the portion of the feed line 38B that runs across the positive terminal 32 to attach the feed line 38B to the positive terminal 32.

The wireless communication device 10 uses the battery 30 to provide a slot antenna 18. The battery 30 has a slot 40 created by the separator 36 between the positive terminal 32 and the negative terminal 34. The wireless communication device 10 is coupled to the slot 40 using a single feed point 42 to form the slot antenna 18. A feed point 42 is any type of conductive connection that allows the transfer of energy. Coupling the wireless communication device 10 to the slot 40 at or proximate to one location on the slot 40 creates an antenna radiation pattern similar to a dipole antenna. The E and H fields of the slot antenna 18 are reversed from the E and H fields of a dipole antenna (not shown). However, it should be noted that the exact radiation pattern of the slot antenna 18 may be different depending on the operating frequency and impedance of the wireless communication device 10 and the geometry and other characteristics, including impedance of the battery 30 and the slot 40.

The feed point 42 may be constructed out of any type of conductive materials, such as copper or aluminum. Additionally, the feed point 42 may be a conductive tab like that used in a patch antenna, such as described in pending patent application Ser. No. 09/678,271, previously referenced above. These feed points 42 may be three millimeters in width or less.

The feed point 42 may be attached to the battery 30 using an adhesive, such as those adhesives discussed above for the feed lines 38. A non-conductive adhesive (not shown) is used for the portion of feed point 42 that runs across the negative terminal 34 of the battery 30 so that the feed point 42 does not form a conductive connection to the negative terminal 34.

Figure 3:
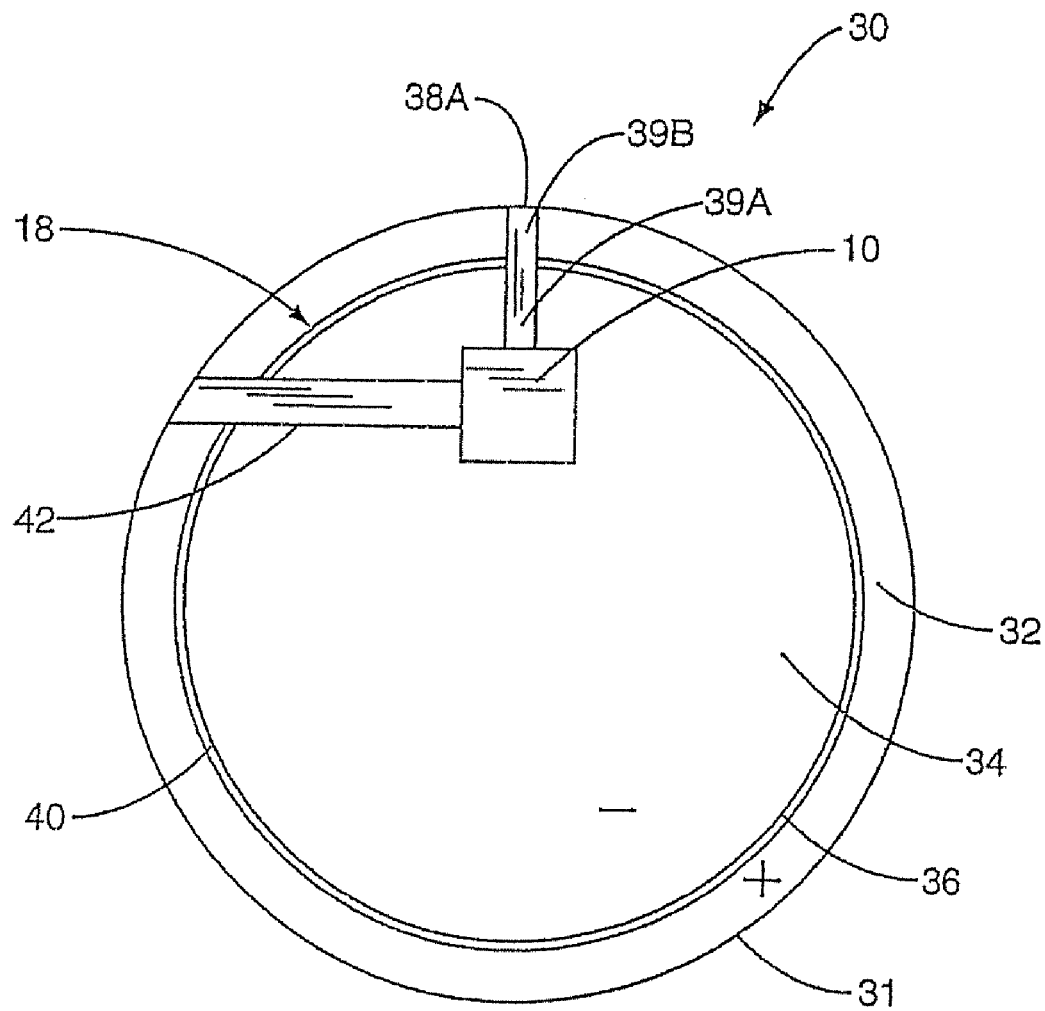
FIG. 3 is a schematic diagram of a wireless communication device attached and grounded to a coin-cell battery for power and coupled to a slot on the battery to form a slot antenna.

FIG. 3 illustrates another embodiment of a wireless communication device 10 that is coupled to a slot 40 to provide a dipole-like slot antenna 18 with a radiation pattern similar to the embodiment illustrated in FIG. 2. However, the wireless communication device 10 in FIG. 3 only has one feed line 38A to couple the wireless communication device 10 to the positive terminal 32 for power. The feed line 38B may be a conductive portion (not shown) provided on the wireless communication device 10 directly to the negative terminal 34 of the point of attachment of the wireless communication device 10 to the battery 30. For example, the wireless communication device 10 may have a pin, if an IC chip, that is attached directly to the negative terminal 34.

Figure 4:
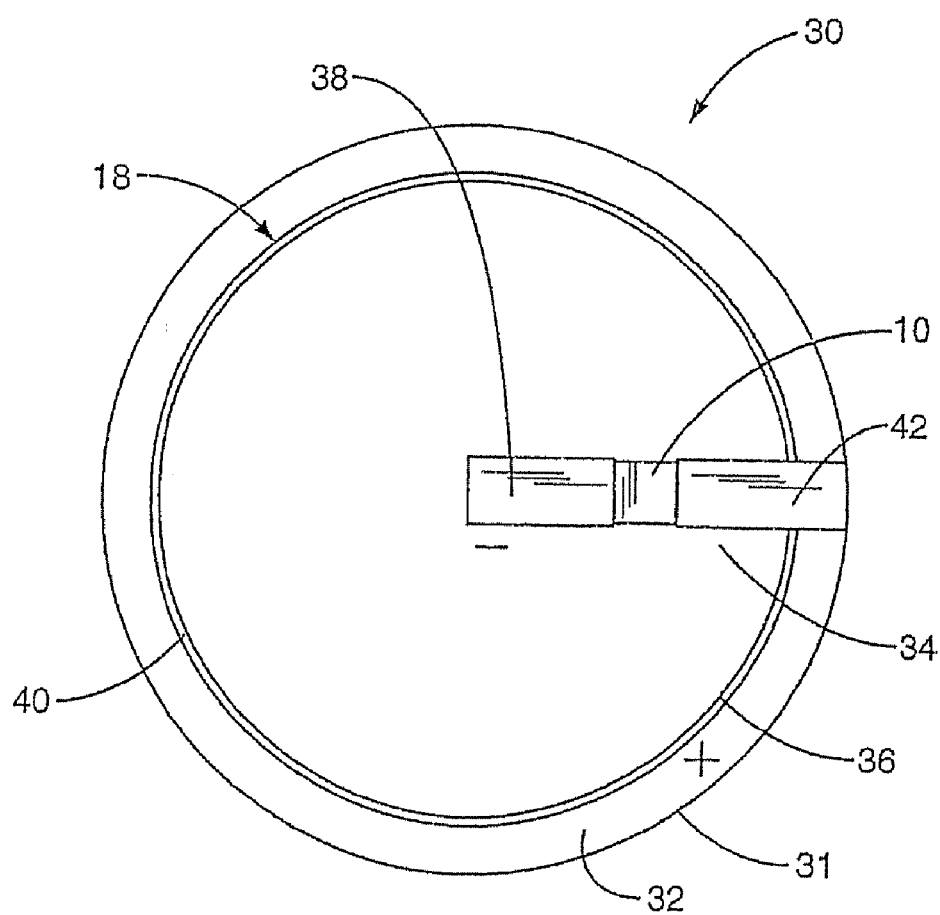
FIG. 4 is a schematic diagram of a wireless communication device having a combined feed line and feed point to couple the wireless communication device to a slot and to a battery terminal for power.

FIG. 4 illustrates another embodiment of the wireless communication device 10 where a feed point 42 that is used to couple the wireless communication device 10 to the slot 40, is also be used as a feed line 38 to couple the wireless communication device 10 to the positive terminal 32 for power. The wireless communication device 10 contains one feed line 38 and one feed point 42. The feed point 42 may be left as an open circuit or may be connected to the positive terminal 32. If the feed point 42 is connected to the positive terminal 32, the wireless communication device 10 can use this connection as a slot antenna 18 as well as a connection to the battery 30 for power. If the feed point 42 is connected to the positive terminal 32 for power, feed line 38 provides a connection between the wireless communication device 10 and the negative terminal 34.

Figure 5:
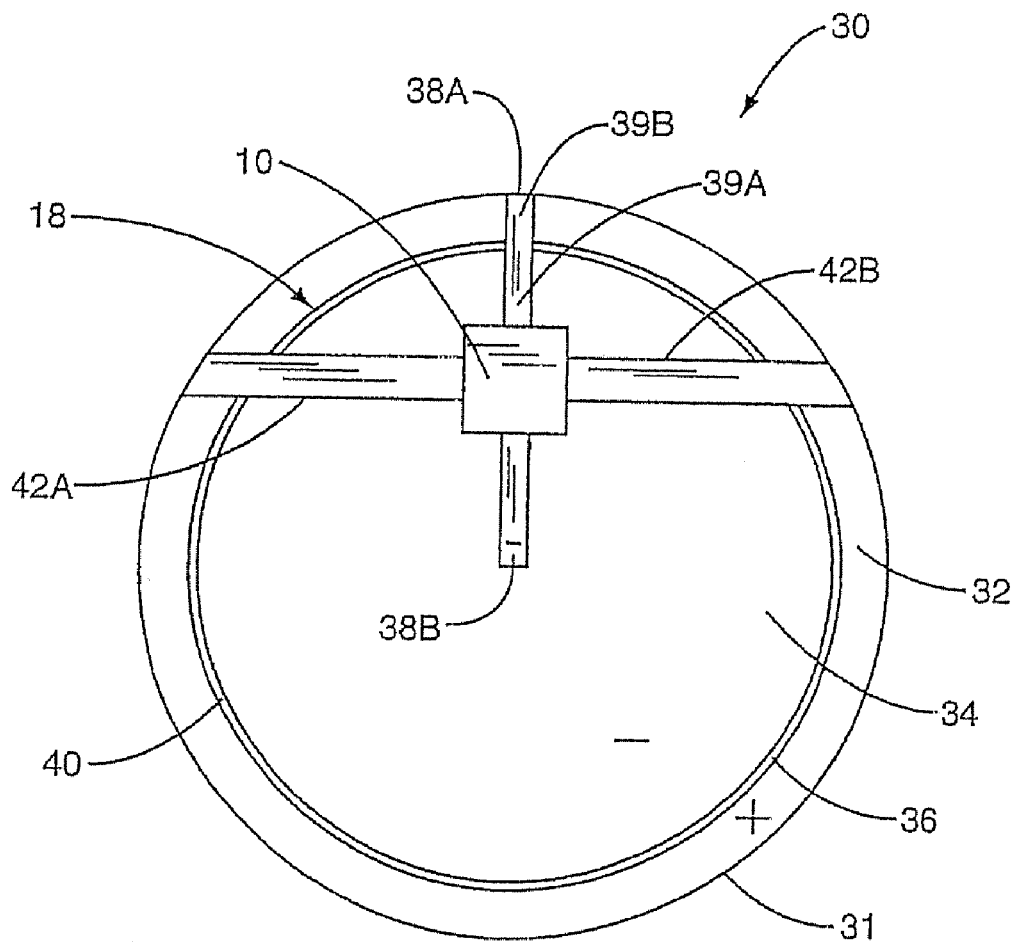
FIG. 5 is a schematic diagram of a wireless communication device attached to a coin-cell battery for power and coupled to a slot in the battery at multiple points to form a slot antenna.

FIG. 5 illustrates another embodiment of a wireless communication device 10 coupled to slot 40 to provide a dipole-like antenna pattern. The wireless communication device 10 is configured similar to the wireless communication device 10 illustrated in FIG. 2; however, two feed points 42A, 42B are used to couple the wireless communication device 10 to the slot 40. Use of multiple feed points 42 may be desirable to change the radiation pattern of the slot antenna 18, and/or to change reception and/or transmission capability. Further, use of more than one feed point 42 may allow the slot antenna 18 and the wireless communication device 10 to operate at multiple frequencies. An example of a wireless communication device using multiple feed points in a slot antenna is disclosed in pending patent application Ser. No. 10/125,783, entitled "Multiple Feed Point Slot Antenna," filed on Apr. 18, 2002 by the assignee of this application, incorporated herein by reference in its entirety.

Figure 6:
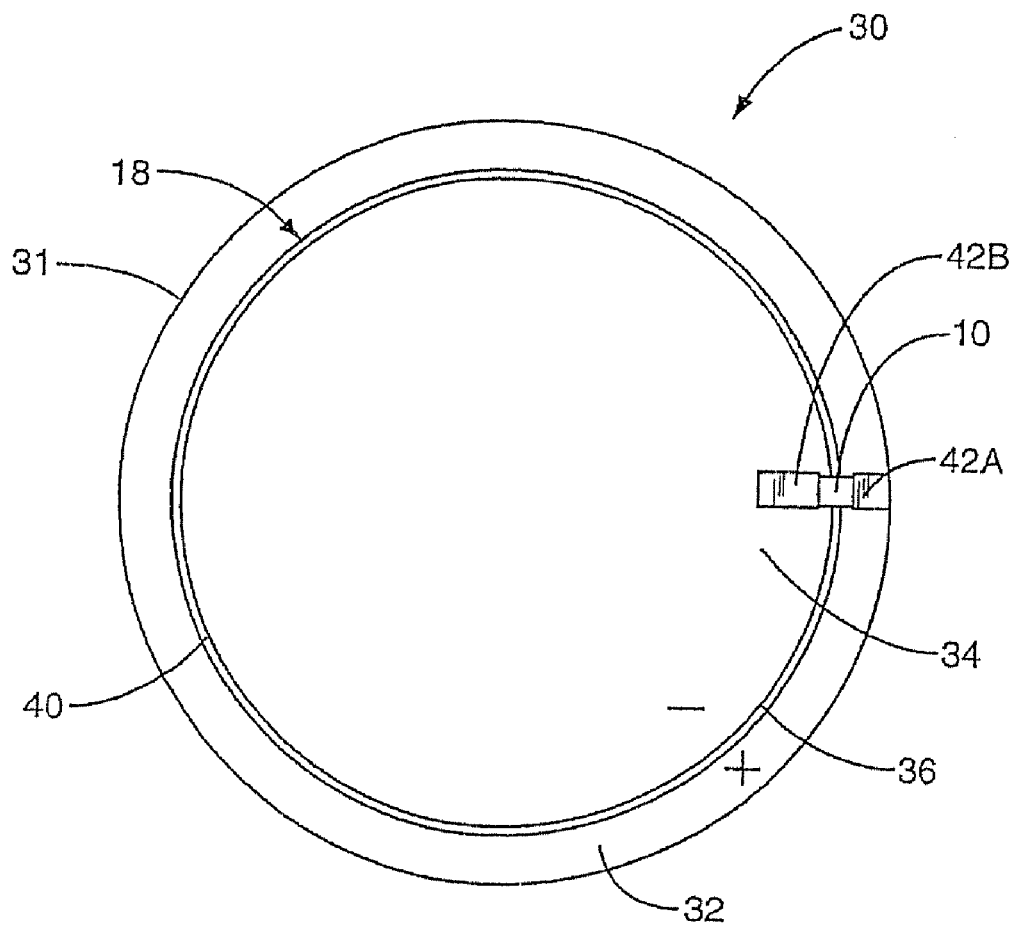
FIG. 6 is a schematic diagram of a wireless communication device placed across a slot formed by a battery seal to form a slot antenna.

FIG. 6 illustrates another embodiment of a wireless communication device 10 that is coupled to a slot 40 on the battery 30 to provide a slot antenna 18. In this embodiment, the wireless communication device 10 is placed across the slot 40. Two feed points 42A, 42B are used; one feed point 42A is coupled to the positive terminal 32 and the other feed point 42B is coupled to the negative terminal 34. If the feed points 42 are non-conductive, the wireless communication device 10 capacitively couples to the slot 40 between the positive terminal 32 and the negative terminal 34 to form a slot antenna 18. If the feed points 42A, 42B are conductively coupled to the terminals 32, 34, such as through soldering or welding for example, the wireless communication device 10 may use such connection for both a connection to terminals 32, 34 for power and connection to the slot 40 to provide a slot antenna 18 without need for a feed line 38.

Figure 7:
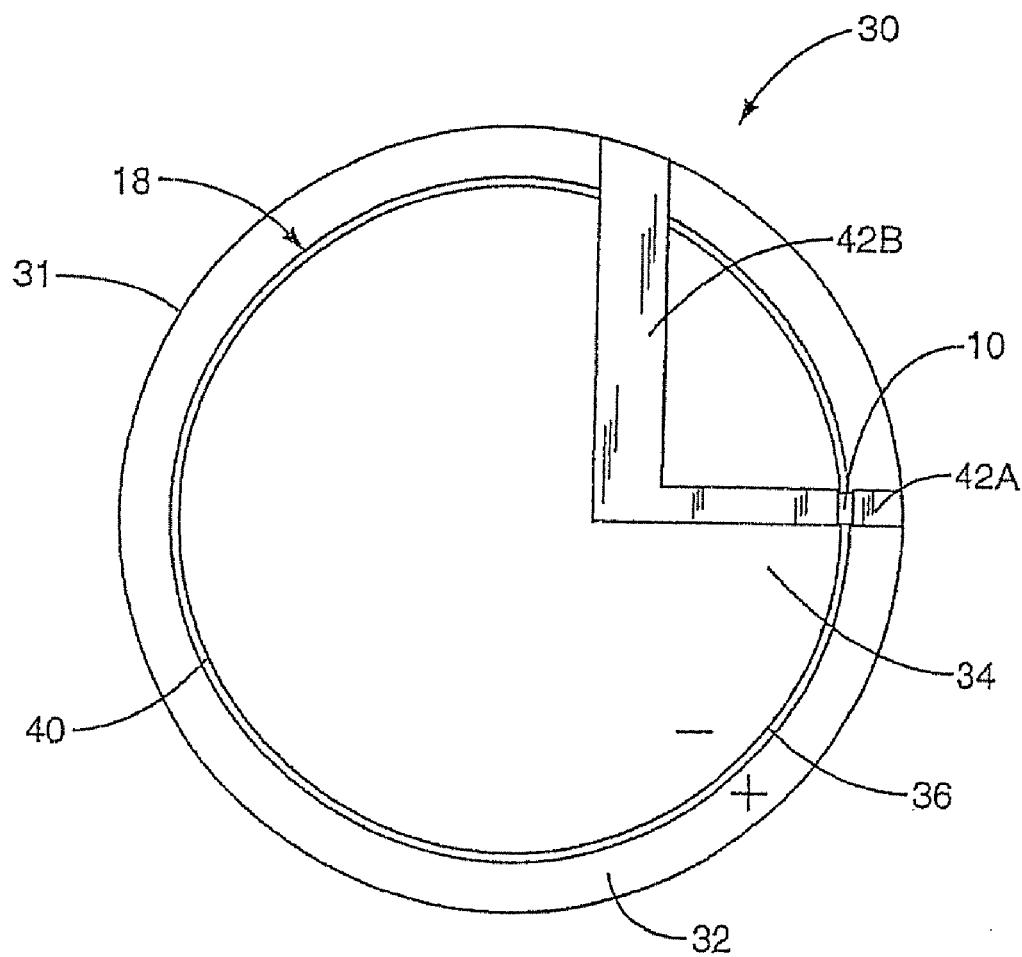
FIG. 7 is a schematic diagram of a wireless communication device placed across a slot formed by a battery seal to form a slot antenna with one feed point additionally extending to cross the slot at a second point.

FIG. 7 illustrates another embodiment of a wireless communication device 10 coupled to a slot 40 on a battery 30 to provide a slot antenna 18. The wireless communication device 10 is coupled across the slot 40 like in FIG. 6. In addition, the feed point 42B is coupled to the slot 40 at a different point than the feed point 42A. This changes the effective length of the slot 40 so that the slot 40 resonates at a particular frequency of design and assists in matching the impedance of the slot 40 to the impedance of wireless communication device 10 for improved antenna 18 performance. The adhesive used for coupling the feed points 42A, 42B to the slot 40 must be non-conductive in the region that the feed points 42A, 42B cross the slot 40, or a short circuit at direct current will be placed across battery 30. Therefore, the feed points 42A, 42B are capacatively coupled to the slot 40.

Figure 8:
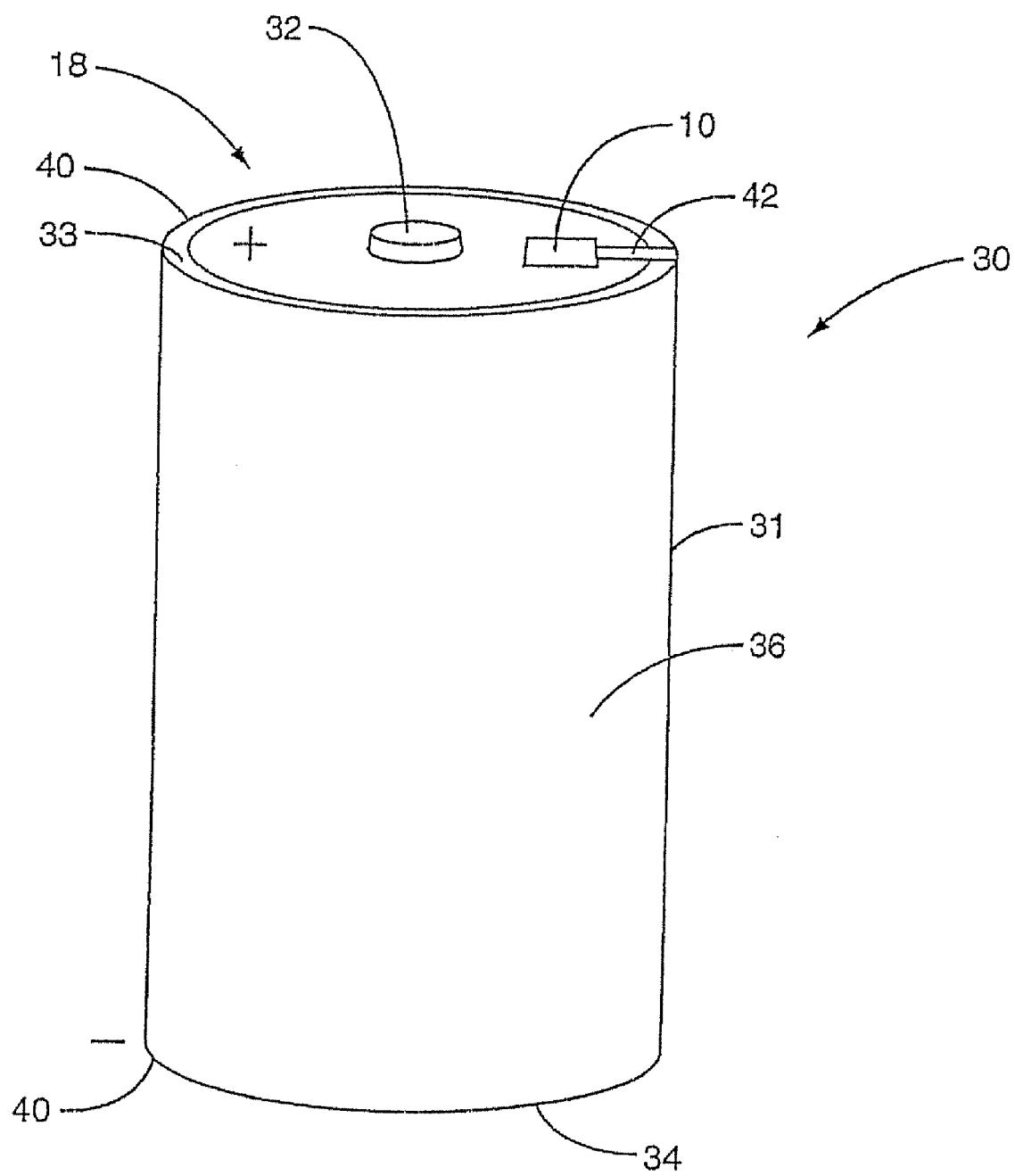
FIG. 8 is a schematic diagram of a wireless communication device attached to a cylindrical-shaped battery and coupled to a slot on the battery to form a slot antenna.

FIG. 8 illustrates another embodiment of the present invention where a wireless communication device 10 is connected to a cylindrical-shaped battery 30. The battery 30 may be a commonly available, off-the-shelf battery, including sizes AA, AAA, C, and D. The battery 30 contains a body 31 that is covered by a sleeve 33 to encapsulate the body 31. The sleeve 33 may be constructed out of a plastic or other encapsulating material and may be heat-shrinkable. The top of the body 31 contains the positive terminal 32, and the bottom of the body 31 contains the negative terminal 34. The separator 36 separates the positive terminal 32 from the negative terminal 34, as previously discussed above.

In this embodiment, the wireless communication device 10 is attached in the upper region of the battery 30 adjacent to the positive terminal 32. The wireless communication device 10 may be attached to the battery 30 using an adhesive (not shown), as previously discussed. A conductive adhesive may be used if the wireless communication device 10 is connected directly to the positive terminal 32 without need for a feed line 38.

Feed lines are not used in this embodiment since the wireless communication device 10 does not use a battery 30 to provide power. The wireless communication device 10 either has its own internal energy source or is a passive device. One feed point 42 is used to couple the wireless communication device 10 to the slot 40 to provide a slot antenna 18.

Figure 9:
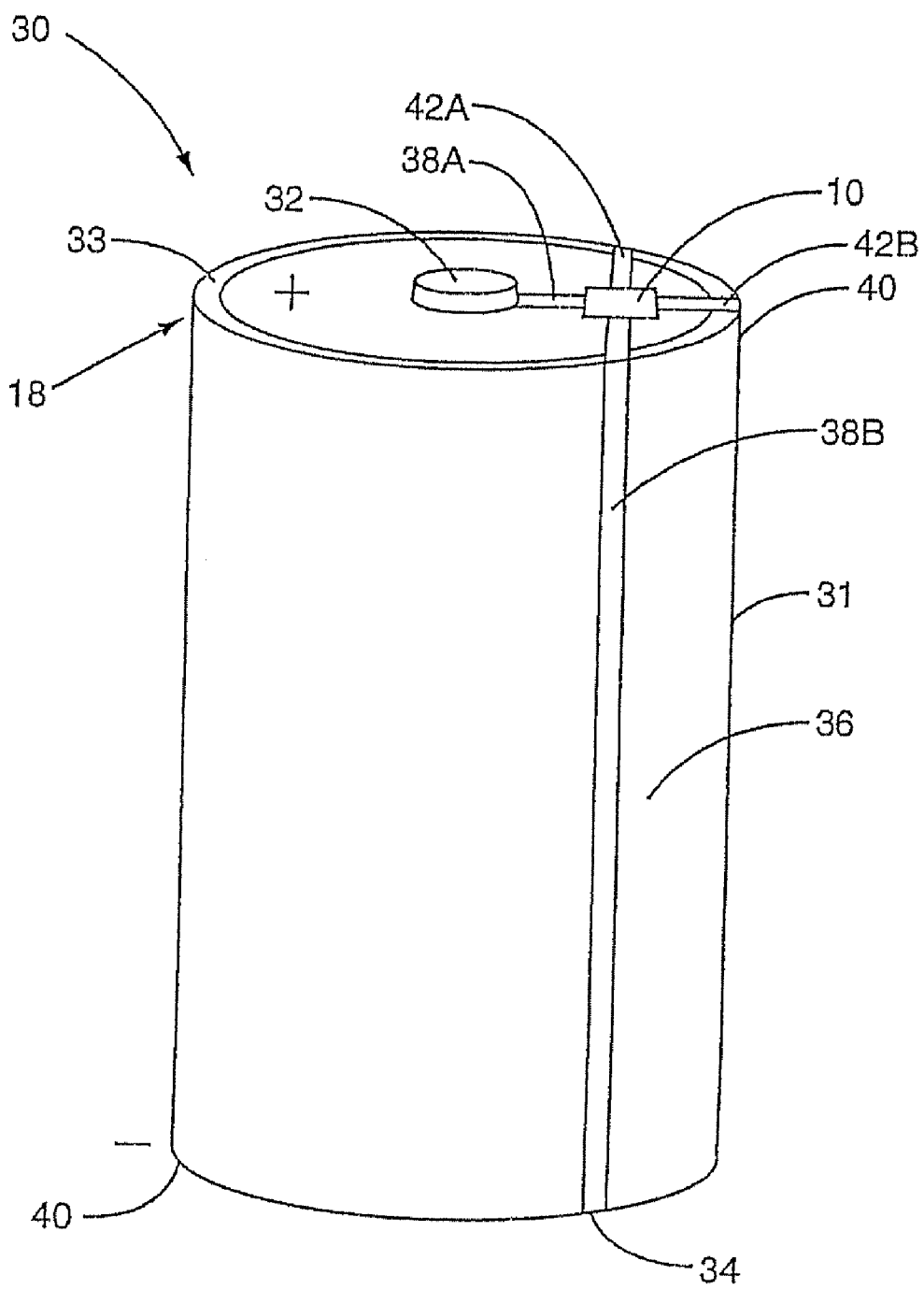
FIG. 9 is a schematic diagram of a wireless communication device attached to a cylindrical-shaped battery for power and coupled to a slot on the battery at multiple points to form a slot antenna.

FIG. 9 illustrates a wireless communication device 10 attached to a battery 30 similar to the embodiment illustrated in FIG. 8; however, the wireless communication device 10 uses feed lines 38A, 38B to couple the wireless communication device 10 to the positive and negative terminals 32, 34 respectively for power like that illustrated in FIG. 5. Two feed points 42A, 42B are also provided so that the wireless communication device 10 is coupled to the slot 40 at two points just as in the embodiment illustrated in FIG. 5.

The feed line 38B extends down the body 31 to the negative terminal 34. Since the body 31 is constructed out of a non-conductive material, any type of adhesive (not shown) may be used to attach the feed line 38B to the battery 30. However, it is more desirable to use a non-conductive adhesive so that any devices or materials that come into contact with the body 31 are not grounded to the negative terminal 34 unwantingly. This embodiment could also be practiced in reverse whereby the wireless communication device 10 is attached to the lower portion of the battery 30 at the negative terminal 34, and the feed line 38A is extended upward to connect to the positive terminal 32. Again, any type of adhesive may be used to attach the feed line 38A to the body 31, but a non-conductive adhesive is more desirable.

Figure 10:
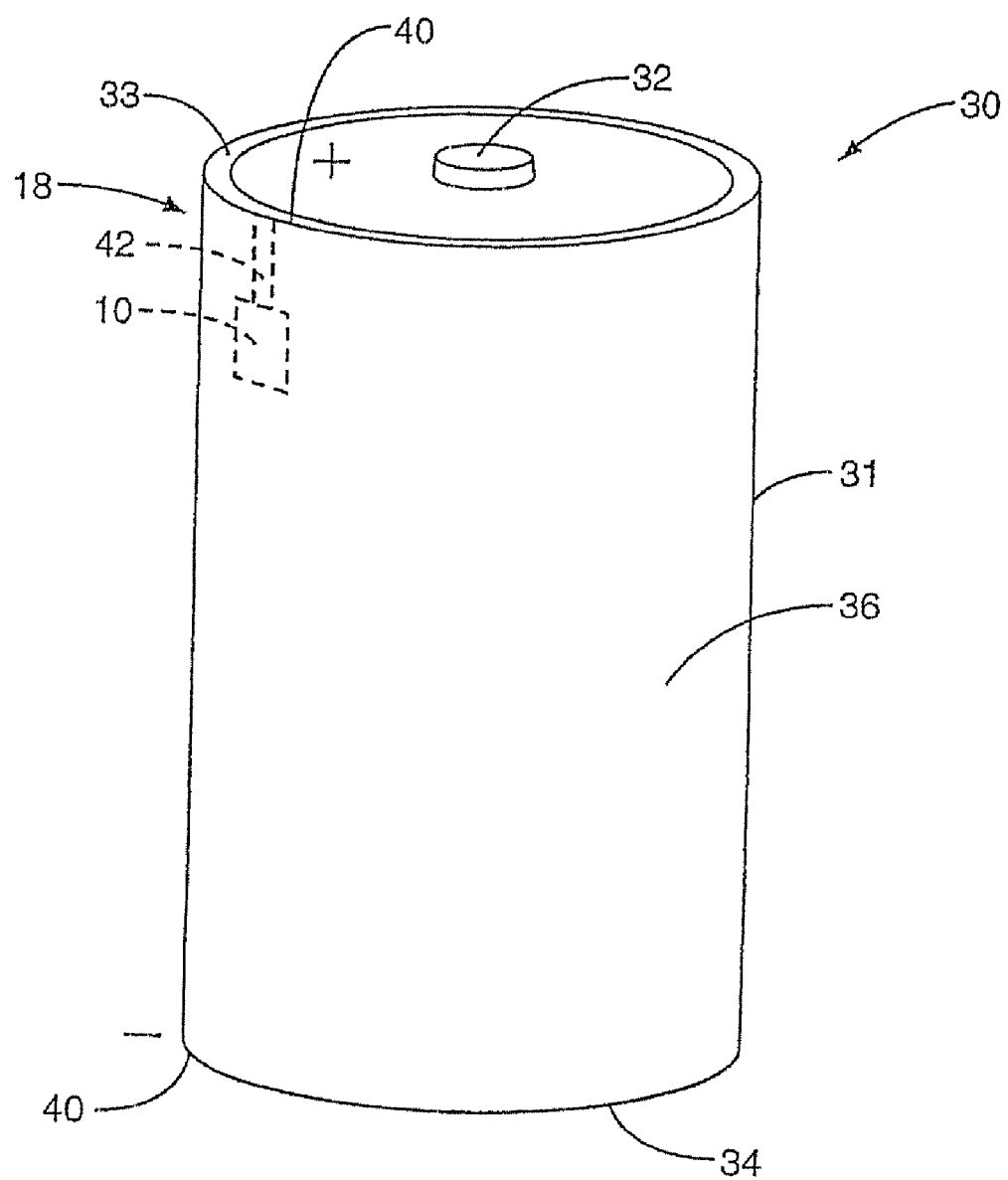
FIG. 10 is a schematic diagram of a wireless communication device attached underneath a battery sleeve and coupled to a slot on the battery to form a slot antenna.

FIG. 10 illustrates a wireless communication device 10 attached underneath the sleeve 33 of a battery 30 as a convenient method of attachment. In this manner, an adhesive may not be required to secure the wireless communication device 10 to the battery 30. The wireless communication device 10 may be attached underneath the sleeve 33 during the manufacturing process of the battery 30. In this particular embodiment, a single feed point 42 is coupled to the slot 40 to provide a slot antenna 18. The wireless communication device 10 is not coupled to the terminals 32, 34 for power. However, the wireless communication device 10 may use feed lines (not shown) to couple the wireless communication device 10 to the terminals 32, 34 for power if desired.

The wireless communication device 10 may also be placed totally internal to a battery 30 (not illustrated). The battery 30 contains an electrolyte plate structure. A non-conductive void area may be constructed between the battery 30 plates, and the wireless communication device 10 may be placed in this void. The wireless communication device 10 may be connected to the positive and negative terminals 32, 34 for power and/or to the slot 40 to provide a slot antenna 18.

The present invention also allows recharging of the energy source 17 illustrated in FIG. 1 if the wireless communication device 10 is coupled to terminals 32, 34. External radio-frequency signals received by the wireless communication device 10 may contain energy. Since the wireless communication device 10 is capable of receiving energy from an external radio frequency signal through its antenna 18, the wireless communication device 10 may recharge the battery 30 using such energy-bearing radio-frequency signal 26 rather than directly connecting the wireless communication device 10 to a power source. More information on recharging systems for energy sources is disclosed in co-pending Provisional Patent Application No. 60/375,247 entitled "Energy source recharging device and method," filed on the same day as the present invention and incorporated herein by reference in its entirety, and attached hereto as an Appendix.

The energy-bearing radio-frequency signal 26 may be generated by an interrogation reader 20 located nearby the wireless communication device 10, or by a remote radio-frequency transmitter. The wireless communication device 10 uses the energy in the energy-bearing radio-frequency signal 26 to recharge the energy source 17, which may be a battery 30. The antenna 18 receives the energy-bearing radio-frequency signal 26 that is used to recharge the energy source 17, and the antenna 18 may be any type of antenna, including a pole antenna or a slot antenna.

Certain modifications and improvements will occur to those skilled in the art upon a reading of the foregoing description. It should be understood that the present invention is not limited to any particular type of wireless communication device 10 and its components, the interrogation reader 20 and its components, energy source 17, slot 40, feed lines 48, feed points 42, etc. For the purposes of this application, couple, coupled, or coupling is defined as either a direct connection or a reactive coupling. Reactive coupling is defined as either capacitive or inductive coupling.

One of ordinary skill in the art will recognize that there are different manners in which these elements can provide to accomplish the present invention. The present invention is intended to cover what is claimed and any equivalents. The specific embodiments used herein are to aid in the understanding of the present invention, and should not be used to limit the scope of the invention in a manner narrower than the claims and their equivalents.

The invention claimed is:

1. A wireless communication energy source system comprising:
   an energy source comprising a body having a first and a second terminal separated by a separator forming a slot between said first and second terminals; and
   a wireless communication device coupled to said slot to form a slot antenna for wireless communication;
   wherein said wireless communication device is coupled to said slot using at least one feed point; and
   wherein said wireless communication device is coupled to said first and second terminals using at least one feed line to provide power to the wireless communication device.

2. The system of claim 1, wherein said wireless communication device is coupled to said first terminal using a first of said at least one feed line and said wireless communication device is directly coupled to said second terminal through a conductive portion of said wireless communication device.

3. The system of claim 2, wherein said wireless communication device comprises a pin and said wireless communication device is directly coupled to said second terminal using said pin.

4. The system of claim 1, wherein said wireless communication device is coupled to said first terminal using a first feed line and said second terminal using a second feed line.

5. The system of claim 4, wherein said first feed line coupled to said first terminal comprises a conductive adhesive and said second feed line coupled to said second terminal comprises a conductive adhesive.

6. The system of claim 5, wherein said first feed line further comprises a portion of non-conductive adhesive, said conductive adhesive portion of said first feed line coupled to said first terminal and said non-conductive adhesive portion of said first feed line coupled to said second terminal.

7. The system of claim 1, wherein said wireless communication device is coupled to said slot using a first of said at least one feed point, said first feed point comprising a conductive adhesive.

8. The system of claim 1, further comprising an interrogator adapted to communicate information wirelessly with said wireless communication device.

9. The system of claim 8, wherein said interrogator emits a signal to said wireless communication device to power said wireless communication device.

10. The system of claim 9, wherein said signal recharges said energy source.

11. The system of claim 9, wherein said interrogator communicates to said wireless communication device to transfer information.

12. A wireless communication energy source system comprising:
    an energy source comprising a body having a first and a second terminal separated by a separator forming a slot between said first and second terminals; and
    a wireless communication device coupled across said slot to form a slot antenna for wireless communication.

13. The system of claim 12, further comprising first and second feed points coupled to said wireless communication device, wherein said first and second feed points are coupled to said first and second terminals, respectively.

14. The system of claim 13, wherein said first and second feed points are non-conductive in a region that said feed points cross said slot.

15. The system of claim 12, further comprising an interrogator adapted to communication information wirelessly with said wireless communication device.

16. The system of claim 15, wherein said interrogator emits a signal to said wireless communication device to power said wireless communication device.

17. The system of claim 16, wherein said signal recharges said energy source.

18. The system of claim 16, wherein said interrogator communicates to said wireless communication device to transfer information.

19. A wireless communication energy source system comprising:
    an energy source comprising a body having a positive terminal and a negative terminal separated by a separator forming a slot between said positive and negative terminals;
    a sleeve coupled to said body; and
    a wireless communication device coupled to said slot using at least one feed point to provide a slot antenna for wireless communication.

20. The system of claim 19, further comprising a conductive adhesive to directly connect said wireless communication device to said positive terminal.

21. The system of claim 19, wherein said wireless communication device is coupled to said slot beneath said sleeve.

22. The system of claim 21, wherein said wireless communication device is coupled to said positive and negative terminals using first and second feed lines to provide power to the wireless communication device.

23. The system of claim 19, further comprising an interrogator adapted to communicate information wirelessly with said wireless communication device.

24. The system of claim 23, wherein said interrogator emits a signal to said wireless communication device to power said wireless communication device.

25. The system of claim 24, wherein said signal recharges said energy source.

26. The system of claim 23, wherein said interrogator communicates to said wireless communication device to transfer information.

27. A method of providing a slot antenna for a wireless communication device comprising:
    providing an energy source having a first and a second terminal separated by a separator and a slot created by said separator in said energy source; and
    coupling the wireless communication device to said slot to form a slot antenna;
    wherein coupling said wireless communication device to said slot comprises:
      coupling said wireless communication device to said slot using at least one feed point; and
      coupling said wireless communication device to said first and second terminals using at least one feed line to provide power to the wireless communication device.

28. The method of claim 27, wherein coupling said wireless communication device to said first and second terminals comprises coupling said wireless communication device to said first terminal using a first of said at least one feed line and coupling said wireless communication device directly to said second terminal through a conductive portion of said wireless communication device.

29. The method of claim 27, wherein coupling said wireless communication device to said first and second terminals comprises coupling said wireless communication device to said first terminal using a first feed line and coupling said wireless communication device to said second terminal using a second feed line.

30. A method of providing a slot antenna for a wireless communication device comprising:
    providing an energy source having a first and a second terminal separated by a separator and a slot created by said separator in said energy source; and
    coupling the wireless communication device across said slot to form a slot antenna for wireless communication.

31. The method of claim 30, wherein coupling said wireless communication device across said slot comprises coupling said wireless communication device to said first terminal via a first feed point and to said second terminal via a second feed point.

32. A method of providing a slot antenna for a wireless communication device comprising:
    providing an energy source having a positive and a negative terminal in a body, said positive and negative terminals separated by a separator, a sleeve coupled to said body, and a slot created by said separator in said energy source; and
    coupling the wireless communication device to said slot using at least one feed point to provide a slot antenna for wireless communication.

33. The method of claim 32, wherein coupling said wireless communication device to said slot comprises coupling said wireless communication device to said slot beneath said sleeve.

34. The method of claim 33, further comprising coupling said wireless communication device to said positive and negative terminals using first and second feed lines to provide power to said wireless communication device.

* * * * *